J. K. HOLBROOK.
PROJECTION APPARATUS FOR REPRODUCING VIEWS IN COLOR.
APPLICATION FILED NOV. 18, 1914.
1,151,787.
Patented Aug. 31, 1915.
3 SHEETS—SHEET 2.
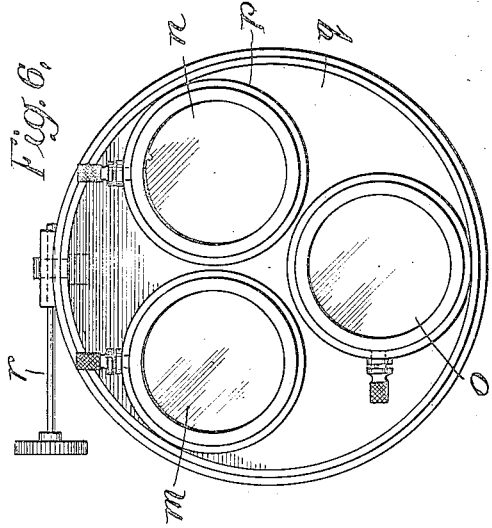
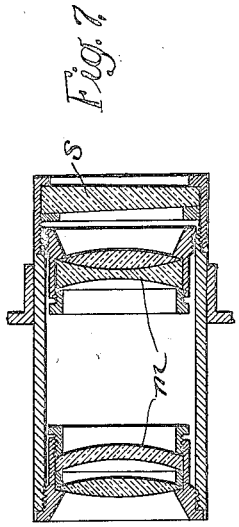
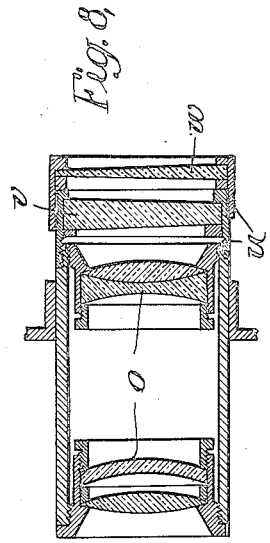
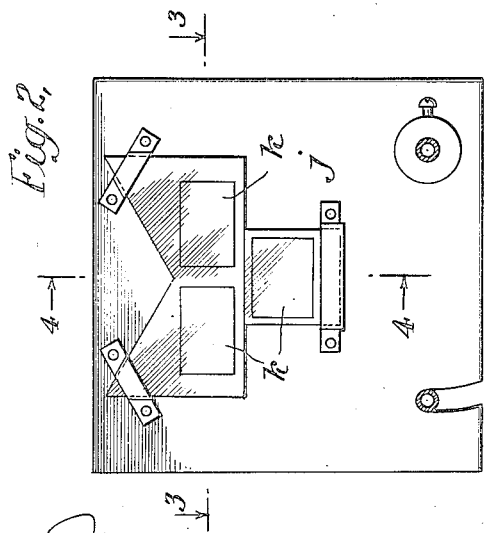
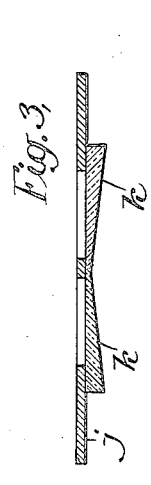
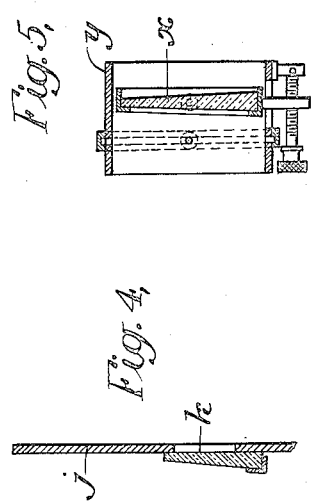
WITNESSES:
INVENTOR
John K. Holbrook
BY
ATTORNEYS

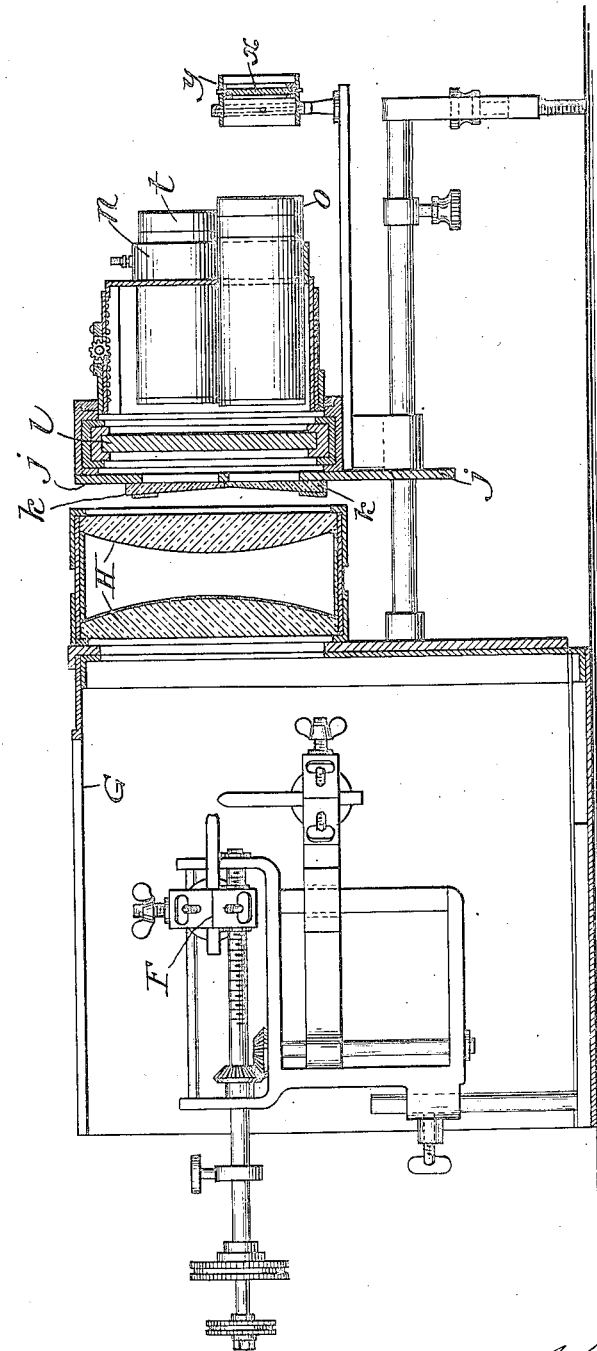

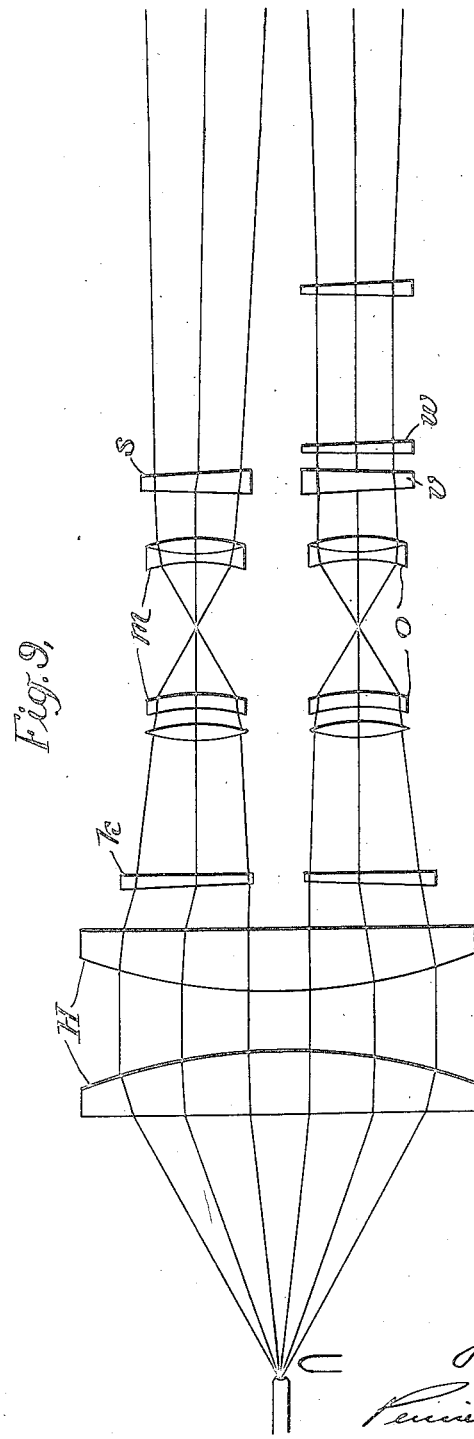

UNITED STATES PATENT OFFICE.

JOHN K. HOLBROOK, OF NEWARK, NEW JERSEY, ASSIGNOR TO D. S. PLUMB, OF EAST ORANGE, NEW JERSEY.

PROJECTION APPARATUS FOR REPRODUCING VIEWS IN COLOR.

1,151,787.

Specification of Letters Patent. Patented Aug. 31, 1915.

Original application filed March 22, 1913, Serial No. 756,188. Divided and this application filed November 18, 1914. Serial No. 872,679.

*To all whom it may concern:*

Be it known that I, JOHN K. HOLBROOK, a citizen of the United States, residence and post-office address 973 South Sixteenth street, Newark, county of Essex, State of New Jersey, have invented certain new and useful Improvements in Projection Apparatus for Reproducing Views in Color; and I do hereby declare the following to be a full, clear, and exact description of the invention, such as will enable others skilled in the art to which it appertains to make and use the same.

The invention relates to the reproduction by photography and projection of scenes and objects appearing in approximately their natural colors, and it particularly comprehends an apparatus for projecting and superposing the photographic impressions of a plurality of separate images of the scene or object, which impressions have been made on a lantern slide, or the like, by means of a camera corresponding to the disclosure of my application for United States Letters Patent, Serial No. 756,188, filed March 22nd, 1913, of which this application is a division, or by equivalent means. The camera disclosed in that application produces a lantern slide, or the like, bearing photographic impressions of a plurality of separate images of the scene or object, each impression being made by light rays of a particular selected color, so that the said images will have different color values; and it is the object of the present invention to provide suitable means for projecting said separate images upon a screen with light appropriately colored by interposition of a color screen of the particular selected color in the light cone projecting each image.

To this end the projection apparatus involves an arrangement by which the distortion of the images, due to unequal refraction, may be corrected, and the several projected images may be superposed upon the screen, by the manipulation, within the projection cones of light, of rotatable prisms. Inasmuch as it is not ordinarily practicable to employ, in the camera by which the several impressions are made, an expensive lens, which is fully corrected, the distortion of the red rays, which are not usually made use of in ordinary photographic work, will considerably exceed the distortion of the other rays. To provide for the correction of this excessive distortion I interpose, in the cone of light producing the red image, or where necessary in the cone of light producing any other of the images, a prism which is adjustable to various degrees of refractive angle.

In the drawings which illustrate a preferred embodiment of my invention, Figure 1 is a sectional elevation of the projecting apparatus and appurtenances. Fig. 2 is a face view of the condenser light diverging prism plate; Fig. 3 is a section on the line 3—3 of Fig. 2; Fig. 4 is a section on the line 4—4 of Fig. 2; Fig. 5 is a central vertical section through the distortion-correcting prism; Fig. 6 is a face view of the projection lens plate and the lenses mounted thereon; Fig. 7 is a central sectional view of a projection lens provided with a single superposing prism; Fig. 8 is a like view of a projection lens provided with a double superposing prism; and Fig. 9 is a diagram of the lens system of the projecting apparatus.

The projection machine illustrated is provided with the electric lamp F and lamp housing G, and the usual condensers H. Up to this point the apparatus is that usually employed in projecting lantern slides. In front of the condenser H a plate *j* carries three prisms *k* which are arranged as shown in Fig. 1 to register approximately with the pictures as they have been impressed upon the plate. The function of these prisms *k* is to diverge the condenser cone of light into three separated cones of light having axes diverging from that of the condenser cone. Immediately forward of the prism plate *j* is located the lantern slide holder *l* by which the lantern slide is placed in front of the prisms *k*. The three separated cones of light passing from the prisms *k* pass through the three pictures upon the lantern slide and from thence pass into three lenses *m*, *n* and *o*. These lenses are small projection lenses of the usual type and each of which is capable of being focused in one of the three lens tubes *p* in a common lens carrier *q* which is itself mounted for movement toward and from the lantern slide by a rack and pinion device *r* in order to focus all three lenses at once. The lenses *m*, *n* and *o* have their axes separated to approximately the same amount as the pictures upon the slide; this separation, however, may be more or less, depending upon the degree of divergence of the three cones of light by the prisms *k*. Each of the lenses is provided with a color screen of the appropriate color to reproduce the particular picture upon the lantern slide which it is intended to project and the color screen is preferably mounted assembled with the lens. If a slide be now inserted in the projection apparatus and the light turned on the three pictures upon the slide may be projected upon a screen, each picture appearing of the proper color. But it is not probable that any two of the pictures projected upon the screen will be superposed, and it is impossible that all three could superpose in view of the fact as before stated that the picture produced upon the slide by the red or orange light is not of the same size or shape as the other two, owing to the distortion produced by the camera lens. However, it is now possible to shut off the light from the red picture and rotate two prisms *s* and *t* which are respectively mounted upon the fronts of lenses *m* and *n* until the violet and green pictures exactly register or superpose. This operation is accomplishable in view of the fact that the rotation of the prism *s* for instance, will produce a translation in a circle of the picture projected through that prism and the rotation of the prism *t* will produce a like translation in a circle of the picture projected through that prism, and that these two circles of translation overlap. It will, therefore, be seen that at the two points where these two circles of translation cut one another exact registry of the two pictures will be effected. It is now necessary to cause the third picture to register with those already registered and for the purpose of accomplishing this easily, I have provided upon the front of the third lens *o* a rotatable prism carrier *u* containing two superposed prisms of low degree *v* and *w* which may be rotated relatively to one another and which may rotate together in said carrier. It will now be seen that by rotating these two prisms *v* and *w* relatively to one another, the two together may be adjusted to give any degree of refraction from zero, if they are alike, to the sum of the degrees of both, and therefore, the circle of translation of the picture provided through these prisms can be made of any desired radius, the circle of translation of the picture being accomplished by rotating the two prisms together in the carrier *u*. In order then to register the third picture with the two already registered upon the screen, the carrier *u* should be rotated until the picture approaches registry and by manipulating prisms *v* and *w* relatively to one another, changing the radius of the circle of translation until the picture is brought by these combined rotations into registry with the two other pictures. Exact registry of all parts of this third picture, owing to its distortion, may not be had immediately, but I have provided a prism *x* located in the path of the rays passing through the lens *o*, which prism *x* may be inclined upon a diametrical axis in a carrier *y* which is rotatable. The carrier *y* can be rotated until the axis of inclination of the prism is transverse of the direction of distortion of the picture produced through the lens *o* and then the prism can be inclined to produce an unequaled distortion of the field of the cone of light passing through it which will exactly compensate the distortion produced in the third picture upon the slide of the camera lens. When these adjustments have been made, and it will be seen that they are easily brought about in the apparatus as described and illustrated, exact registry of the three pictures may be effected. It will be found that slight, if any, readjustments will be required when another slide is substituted.

It will be obvious that the apparatus may be adapted for the projection of two pictures instead of three or of more than three, when the colors are chosen to produce the color effects desired. When only two pictures are projected, it is, of course, not necessary to employ the adjustable superposed prism applied to the third lens.

What I claim is:

1. In apparatus for the reproduction of scenes and objects in color by photography and projection, a projection lens and a rotatable prism mounted to intercept the light from said lens for translating the projected image from said lens in a circle; substantially as described.

2. In apparatus for the reproduction of scenes and objects in color by photography and projection, a plurality of projection lenses and a plurality of rotatable prisms each mounted to intercept the light from one of said lenses; substantially as and for the purposes set forth.

3. In apparatus for the reproduction of scenes and objects in color by photography and projection, three projection lenses, two rotatable prisms each mounted to intercept the light from one of said lenses and a rotatable adjustable degree prism mounted to intercept the light from the third of said lenses, said adjustable degree prism comprising two prisms of low degree rotatable together as well as relatively to one another; substantially as and for the purposes set forth.

4. In apparatus for the reproduction of scenes and objects in color by photography and projection, a projection lens, and a prism mounted to intercept the light from said lens, said prism being adjustable angularly relatively to said lens upon an axis perpendicular to the axis of said lens; substantially as and for the purposes set forth.

5. In apparatus for the reproduction of scenes and objects in color by photography and projection, a projection lens, and a prism mounted to intercept the light from said lens, said prism being rotatable upon an axis coincident with that of said lens and adjustable angularly relatively to said lens upon an axis perpendicular to the axis of said lens; substantially as and for the purposes set forth.

6. In apparatus for the reproduction of scenes and objects in color by photography and projection, three projection lenses, two rotatable prisms each mounted to intercept the light from one of said lenses and a rotatable adjustable degree prism mounted to intercept the light from the third of said lenses; substantially as and for the purposes described.

In testimony whereof I affix my signature in presence of two witnesses.

JOHN K. HOLBROOK.

Witnesses:
M. A. BILL,
K. M. SCHULZ.